(12) United States Patent
Grevers, Jr.

(10) Patent No.: US 8,799,396 B2
(45) Date of Patent: Aug. 5, 2014

(54) METHOD AND SYSTEM FOR AN EFFICIENT DISTRIBUTED CACHE WITH A SHARED CACHE REPOSITORY

(75) Inventor: Theodore Robert Grevers, Jr., Milford, MA (US)

(73) Assignee: Cisco Technology, Inc., San Jose, CA (US)

(*) Notice: Subject to any disclaimer, the term of this patent is extended or adjusted under 35 U.S.C. 154(b) by 747 days.

(21) Appl. No.: 12/025,357

(22) Filed: Feb. 4, 2008

(65) Prior Publication Data
US 2009/0198790 A1   Aug. 6, 2009

(51) Int. Cl.
*G06F 15/16* (2006.01)
*G06F 12/08* (2006.01)
*H04L 29/08* (2006.01)

(52) U.S. Cl.
CPC ........ *H04L 67/2842* (2013.01); *H04L 67/2885* (2013.01); *H04L 67/288* (2013.01); *H04L 67/28* (2013.01)
USPC ........... 709/213; 709/214; 709/215; 711/119; 711/124; 711/141; 711/144; 711/145

(58) Field of Classification Search
USPC ................. 709/213, 214, 215, 216, 204, 205; 711/118, 119, 129, 141
See application file for complete search history.

(56) References Cited

U.S. PATENT DOCUMENTS

| | | | | |
|---|---|---|---|---|
| 5,809,527 A * | 9/1998 | Cooper et al. | ................ | 711/133 |
| 5,933,849 A * | 8/1999 | Srbljic et al. | ................ | 711/118 |
| 7,231,492 B2 * | 6/2007 | Baxter, III | ................ | 711/113 |
| 7,478,120 B1 * | 1/2009 | Zhang | ................ | 709/201 |
| 8,095,500 B2 * | 1/2012 | Rose et al. | ................ | 707/609 |
| 2003/0065874 A1 * | 4/2003 | Marron et al. | ................ | 711/100 |
| 2004/0044727 A1 * | 3/2004 | Abdelaziz et al. | ................ | 709/203 |
| 2004/0088646 A1 * | 5/2004 | Yeager et al. | ................ | 715/500 |
| 2008/0086754 A1 * | 4/2008 | Chen et al. | ................ | 725/105 |
| 2009/0168795 A1 * | 7/2009 | Segel | ................ | 370/429 |

OTHER PUBLICATIONS http://research.microsoft.com/pubs/65213/past-sosp.pdf "Storage management and caching in PAST, a large-scale, persistent peer-to-peer storage utility"—Rowstron et al, Microsoft, Nov. 2006.*

* cited by examiner

*Primary Examiner* — Randy Scott
(74) *Attorney, Agent, or Firm* — Schwegman Lundberg & Woessner, P.A.

(57) ABSTRACT

Network cache systems are used to improve network performance and reduce network traffic. An improved network cache system that uses a centralized shared cache system is disclosed. Each cache device that shares the centralized shared cache system maintains its own catalog, database or metadata index of the content stored on the centralized shared cache system. When one of the cache devices that shares the centralized shared cache system stores a new content resource to the centralized shared cache system, that cache device transmits a broadcast message to all of the peer cache devices. The other cache devices that receive the broadcast message will then update their own local catalog, database or metadata index of the centralized share cache system with the information about the new content resource.

16 Claims, 9 Drawing Sheets

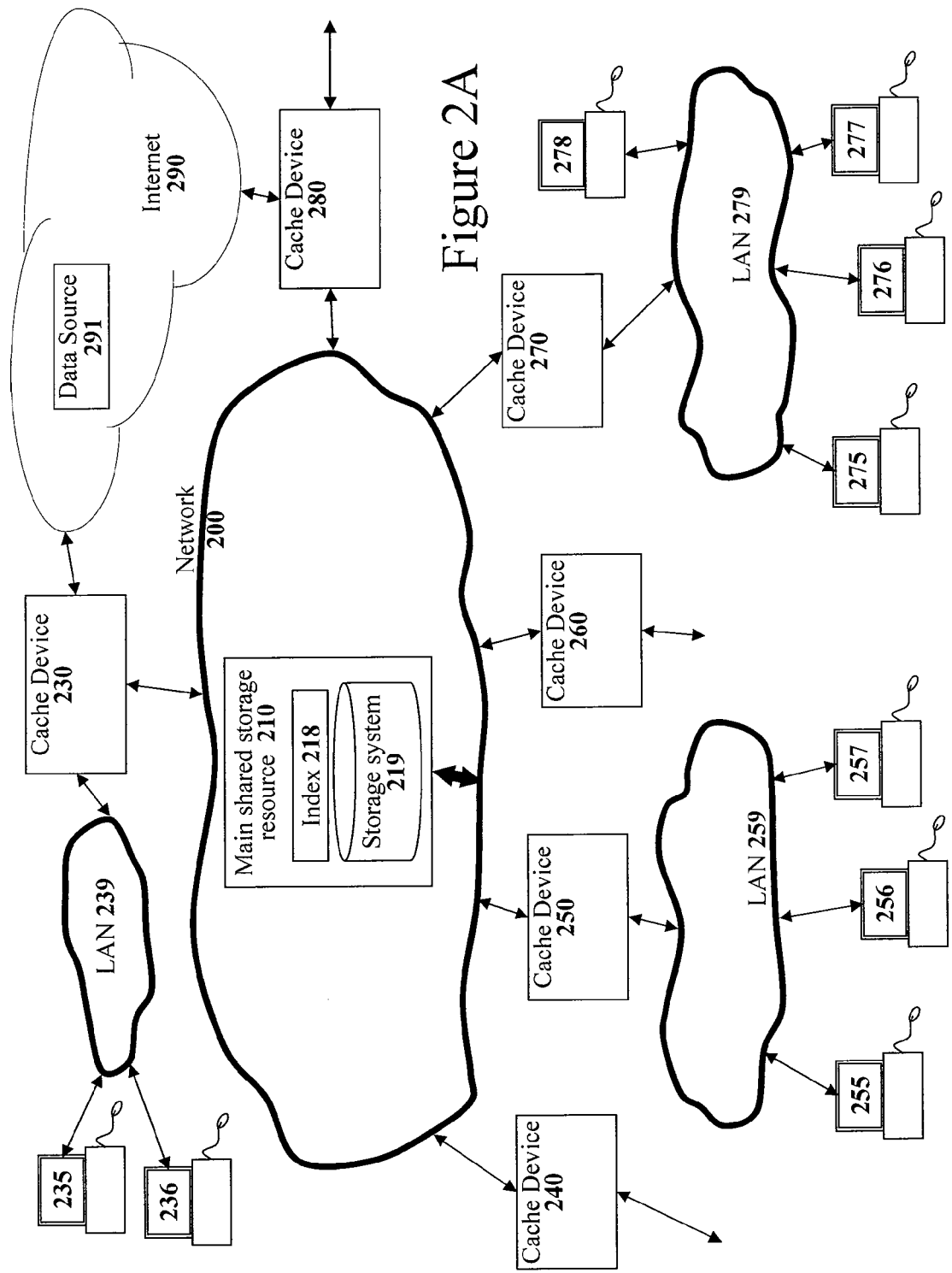

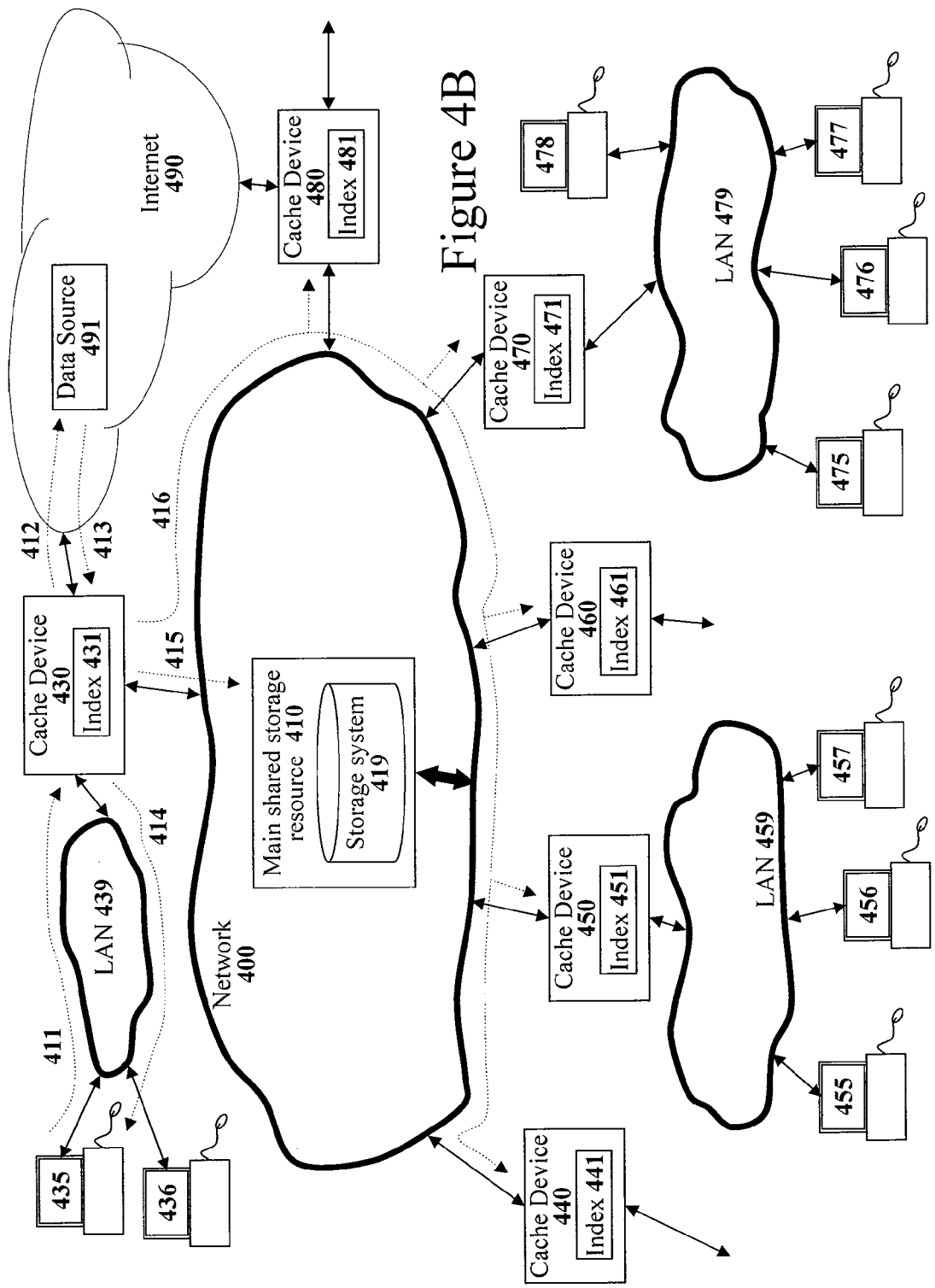

METHOD AND SYSTEM FOR AN EFFICIENT DISTRIBUTED CACHE WITH A SHARED CACHE REPOSITORY

FIELD

The present disclosure relates generally to computer network systems. In an example embodiment, the disclosure relates to a cache system that operates with a multicast protocol for maintaining a directory of a shared cache resource.

BACKGROUND

To increase performance, computer systems often implement cache memory/storage systems. A cache memory/storage system is a collection of data duplicating original data values stored elsewhere, where the original data is more expensive to fetch relative to the cost of reading the cached data. The original data may be relatively more expensive to fetch due to slow access time, bandwidth limitations, latency, or other reason. Thus, a cache memory/storage is a temporary storage area where frequently accessed data can be stored for rapid access. Once data is stored in a cache memory/storage system then all future requests for that same data can be made by accessing the cached copy of data rather than re-fetching the original data.

Cache memory/storage systems are implemented in many different areas of computer science. For example, cache memory/storage systems may be implemented within individual computer processors, within computer memory systems, within long term storage systems such as disk drive systems, within computer networks, and in any other situation wherein a performance improvement may be obtained by including a small, local, and/or faster cache memory/storage system that replicates a portion of a larger but lower performance memory/storage system.

A key concept in cache memory systems is cache coherency. Cache coherence refers to the integrity of data stored in local caches of a shared storage/memory resource. When two or more cache devices maintain caches of a common memory resource then problems may arise. For example, if a first cache device has a copy of a memory block from a previous read and a second cache device changes that same memory block then the first cache device could be left with an invalid cache of memory absent any notification of the change made by the second cache device. Cache coherence systems are intended to manage such potential cache conflicts and maintain consistency of the data between multiple caches and the main memory/storage resource.

BRIEF DESCRIPTION OF DRAWINGS

The present disclosure is illustrated by way of example and not limitation in the figures of the accompanying drawings, in which like references indicate similar elements and in which:

FIG. 2A illustrates a conceptual diagram of a computer network with a main shared storage resource that is shared by multiple network cache devices.

FIG. 4B illustrates a network diagram depicting how a network cache device will obtain server requested content and also store that content on the main shared storage resource when that requested content is not currently cached on the main shared storage resource.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

The embodiments described herein provide methods and apparatuses for implementing a cache system that uses a share cache storage system. Each cache device that shares the centralized share cache system maintains its own catalog, database or metadata index of the content stored on the centralized share cache system. When one of the cache devices that shares the centralized share cache system stores a new content resource to the centralized share cache system, that cache device transmits a broadcast message to all the peer cache devices. The other cache devices that receive the broadcast message will then update their own local catalog, database or metadata index of the centralized share cache system with the information about the new content resource.

Example Embodiments

Figure 1:
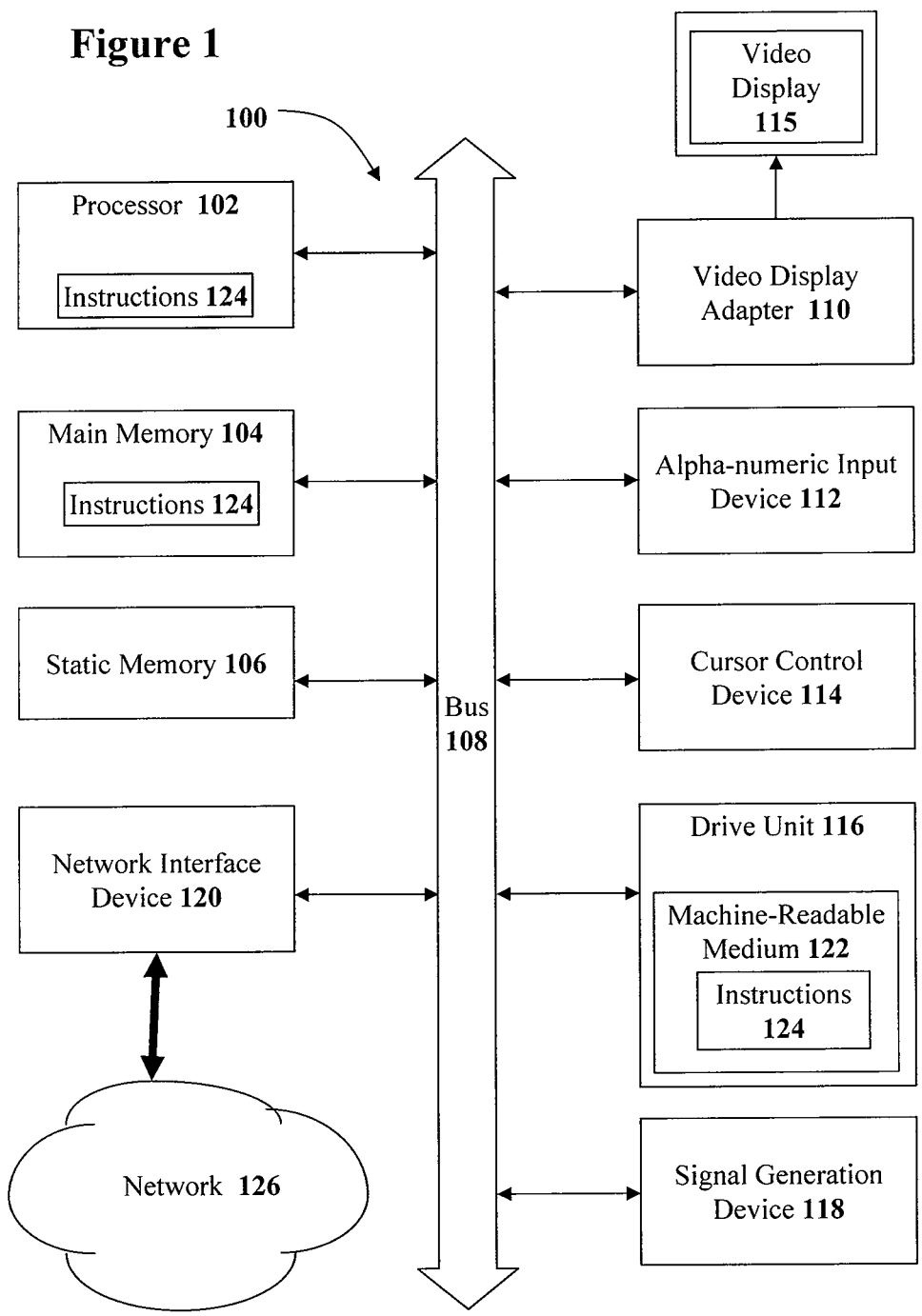
FIG. 1 illustrates a simplified block diagram of a machine in the example form of a computing system, in accordance with an example embodiment.

FIG. 1 illustrates a simplified block diagram of a machine in the example form of a computing system 100 within which a set of instructions, for causing the machine to perform any one or more of the methodologies discussed herein, may be executed. In alternative embodiments, the machine may be connected (e.g., networked) to other machines. The machine may be a network router (e.g., label switch router), switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computing system 100 includes processor 102 (e.g., a central processing unit (CPU)), main memory 104 and static memory 106, which communicate with each other via bus 108. Computing system 100 may also include disk drive unit 116 and network interface device 120.

Disk drive unit 116 includes machine-readable medium 122 on which is stored one or more sets of instructions and data structures (e.g., software 124) embodying or utilized by any one or more of the methodologies or functions described herein. Software 124 may also reside, completely or at least partially, within main memory 104 and/or within processor 102 during execution thereof by computing system 100, with main memory 104, and processor 102 also constituting machine-readable, tangible media. Software 124 may further be transmitted or received over network 126 via network interface device 120 with a carrier wave utilizing any one of a number of well-known transfer protocols (e.g., File Transport Protocol (FTP), HyperText Transfer Protocol (HTTP)).

While machine-readable medium 122 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical media, magnetic media, and carrier wave signals.

A computing system 100 for an end user may include a video display adapter 110 for generating a display upon a video display device 115 such as a Cathode Ray Tube (CRT) or Liquid Crystal Display (LCD) panel. An end user system may also include input devices such as an alpha-numeric input device 112 (e.g., keyboard) and a cursor control device 114 such as a mouse or trackball.

Computer Network Caching

FIG. 2A illustrates a simplified diagram of an example computer network. Generally, a computer network 200 is a distributed collection of nodes interconnected by communication links for transporting data between end nodes that may be servers, personal computers (PCs), workstations, thin-client systems, and other computer network device. The nodes communicate over computer network 200 by exchanging discrete frames or packets of data according to predefined protocols, such as Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, interior gateway protocol (IGP), or other appropriate communication protocols. Note that although the example computer network 200 is illustrated as a single local network, the computer network 200 may be implemented as individual different networks coupled by network routers.

To improve the performance of a computer network, network caching may be used. Network caching operates by having a nearby network cache device serve network based information to more than one client system. When the network cache device serves a particular data file to a client constituent, it may create its own local copy of that data file. Then, when a different client constituent requests the same data file, the network cache device can serve that data file from its local copy.

When several network cache devices are installed in a common location, each network cache device may use local storage or centralized storage to store the cached content. With local storage, each network cache device maintains is own index of the information stored in its own local storage. With a centralized network cache system, each network cache device shares a common storage resource. With a centralized cache system, each independent network cache device has access to some type of catalog, database or metadata index of the content that has been stored in the centralized storage in order to locate and serve the content in the centralized storage repository.

The example computer network 200 of FIG. 2A includes a main shared storage resource 210 and multiple cache devices (230, 240, 250, 260, 270, and 280) that share the main shared storage resource 210. Main shared storage resource 210 has a storage system 219 such as a hard disk drive or an array of disk drives. Each of the multiple cache devices (230, 240, 250, 260, 270, and 280) that share the main shared storage resource 210 serves information to a client constituency. For example, cache device 270 serves information to nodes on local area network (LAN) 279 such as computer workstations 275, 276, 277, and 278. Similarly, cache device 250 serves information to nodes on local area network 259 such as computer workstations 255, 256, and 257. Note that local area networks 239, 259, and 279 are illustrated as distinct physical networks, all of the devices on those networks (and the devices on computer network 200) may be on a single physical network. The local area networks 239, 259, and 279 may be implemented as virtual local area networks (VLANs).

Traditionally, the catalog, database or metadata index for a centralized cache storage system is created and maintained by the centralized cache storage system itself as illustrated in FIG. 2A with index 218 in main shared storage resource 210. However, such a centralized catalog, database or metadata index model can be inefficient. For example, to query for a particular piece of data, each individual cache device presents a request to the centralized catalog, database or metadata index to locate the data. After the initial query, the cache device then retrieves the located data from the centralized cache storage system. Thus, the centralized cache storage system handles both the look-up of cached data and the retrieval of cached data for every data request.

The centralized database model as depicted in FIG. 2A may incur slow response times, depending on the number of simultaneous access requests placed by cache devices to the centralized catalog, database or metadata index 218 in the main shared storage resource 210. A heavy load of access requests placed on main shared storage resource 210 will create slower performance for any cache devices dependent on access to the main shared storage resource 210.

Improved Centralized Computer Network Caching

To improve the efficiency of a cache system that employs a shared cache storage such as the shared cache system of FIG. 2A, the disclosure proposes a cache system wherein each cache device maintains its own catalog, database or metadata index of the content stored on the main shared storage resource 210. When each cache device maintains its own catalog, database or metadata index, the cache device can operate independent of activities or processes which occur on peer cache devices. Furthermore, the disclosure invention proposes a broadcast method of sharing information concerning the catalog, database or metadata index of data stored in main shared storage resource 210 among the caching devices that share main shared storage resource 210. In one embodiment, a broadcast is transmitted at the time any new or changed content is written to the main shared storage resource 210.

When a cache device broadcasts the placement of any new content onto the main shared storage resource 210, the other cache devices that share the main shared storage resource 210 with the broadcasting cache device will receive information on the new content stored into the shared central storage and update their own local catalog, database or metadata index of the main shared storage resource 210 with the information about the newly stored content. In this manner, any future requests to those other client devices for the newly stored content can quickly and easily be retrieved from the main shared storage resource 210 using the information about the newly stored content. Thus, the system of the disclosure allows all the other participating cache devices to provide "cache hit" responses to requests for content that those other cache devices have never directly touched. An example embodiment is set forth with reference to FIGS. 2B and 2C.

Figure 2B:
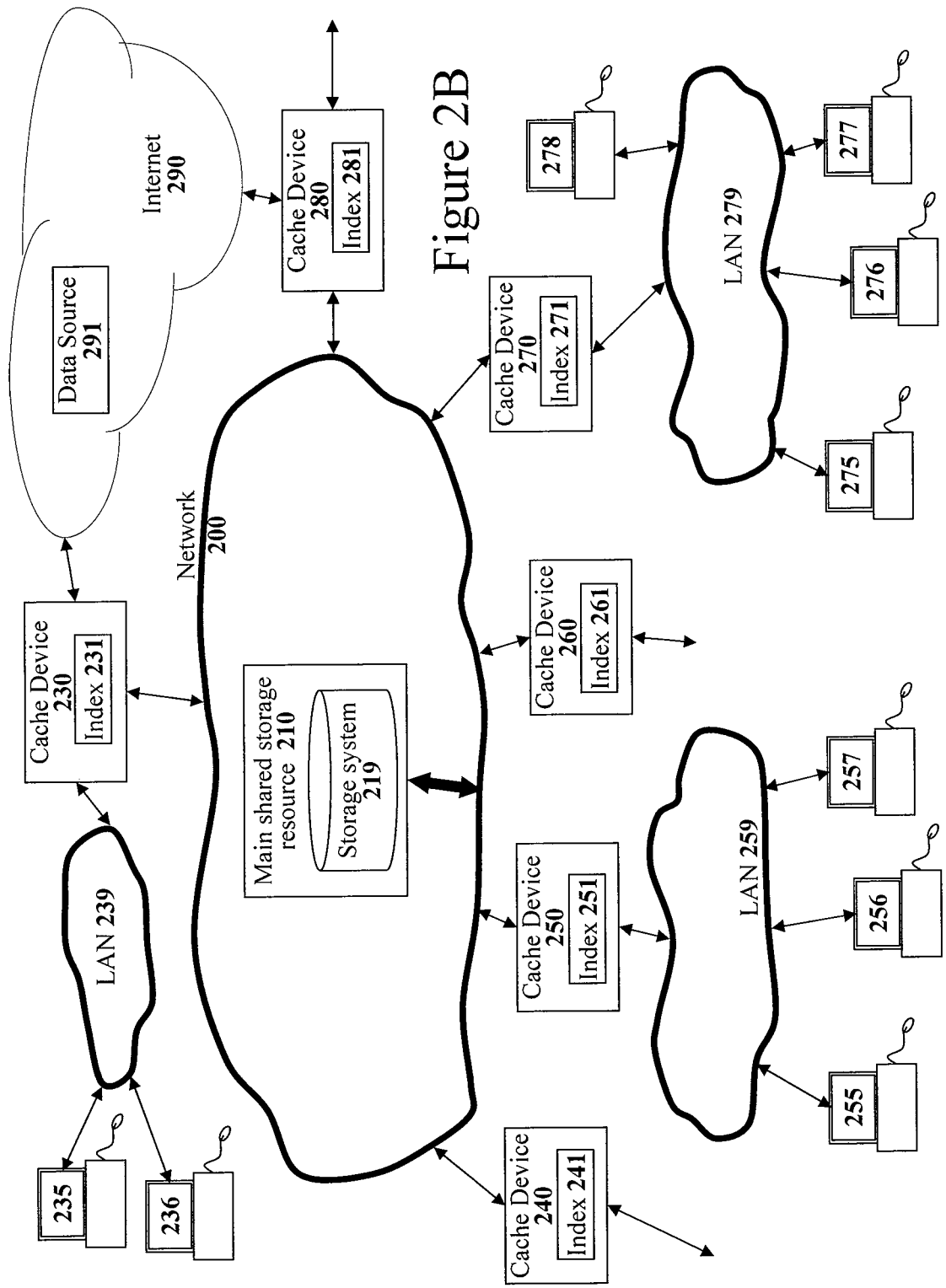
FIG. 2B illustrates the computer network of FIG. 2A wherein each of the multiple network cache devices maintains its own index of the content stored on the main shared storage resource.

FIG. 2B illustrates the network cache system of FIG. 2A wherein there are six network cache devices (230, 240, 250, 260, 270, and 280) that share a main shared storage resource 210. In the network cache system illustrated in FIG. 2B, each of the network cache devices (230, 240, 250, 260, 270, and 280) has its own index (231, 241, 251, 261, 271, and 281) of the content stored in main shared storage resource 210. Each of the six network cache devices (230, 240, 250, 260, 270, and 280) may store content on the storage system 219 of main shared storage resource 210. Similarly, each of the network cache devices may read any of the content stored in the main shared storage resource 210 thus providing for a common pool of cached content that is accessible by all six network cache devices attached to the main shared storage resource 210.

Figure 2C:
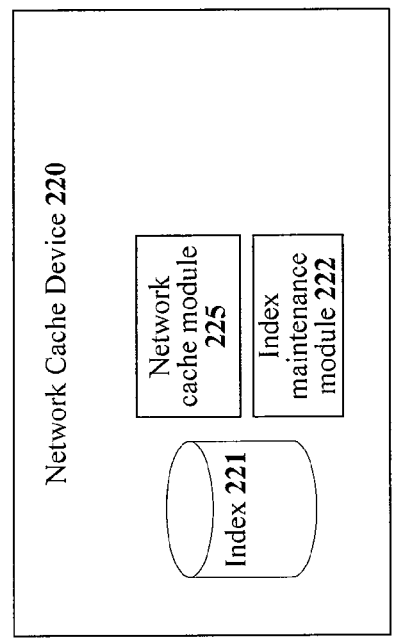
FIG. 2C illustrates a block diagram of an example network cache device.

FIG. 2C illustrates a more detailed view of an example network cache device 220. In the example network cache device 220 the index 221 is displayed along with an index maintenance module 222 that handles updates to the index. Specifically, the index maintenance module adds an entry to the local index 221 of said shared cache storage system upon receiving a message from a peer cache device that has added new content to said shared cache storage system. The example network cache device 220 also includes a network cache module 225. The network cache module receives and handles requests for content resource from client systems served by the network cache device 220. The network cache module 225 serves content from the shared cache storage system when the local index 221 of the network cache device 220 specifies that the shared cache storage system contains requested content.

Figure 3:
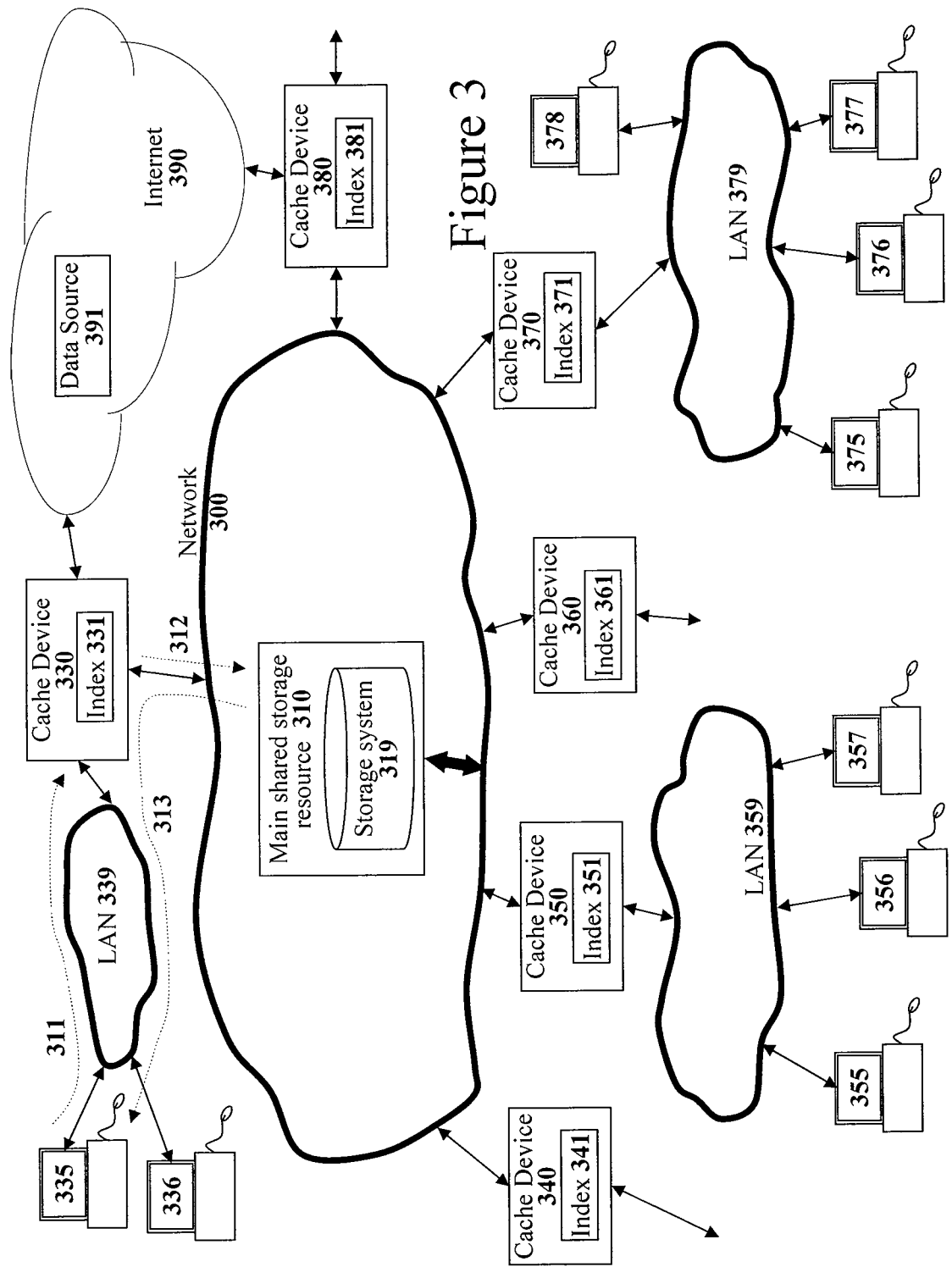
FIG. 3 illustrates how a network cache device uses its own index of the content stored on the main shared storage resource to satisfy a request for content that is currently cached on the main shared storage resource.

FIG. 3 illustrates how the networked cache system of FIG. 2B services requests for content that is available in the main shared storage resource 310. Referring to FIG. 3, a client system 335 on local area network (LAN) 339 may request some content from network cache device 330 as depicted by request data path 311. The request may be for content that is available on the internet 390 or any other network accessible location. When network cache device 330 receives such a request for content, network cache device 330 will first consult its local index 331 of the content stored on the main shared storage resource 310 to determine if the requested content happens to be available on the main shared storage resource 310. The test of the local index may use the requested file's Uniform Resource Locator (URL) in a TCP/IP based embodiment. However, the network cache system may be implemented with any other system for addressing content available on a network.

If network cache device 330 locates the requested content in its local index 331 of the information stored in the main shared storage resource 310, then network cache device 330 uses that information to access the requested information. For example, FIG. 3 illustrates a data request 312 from network cache device 330 to the main shared storage resource 310. Since the local index 331 of the content stored in the main shared storage resource 310 contains all the information needed to access any content stored on the main shared storage resource 310, network cache device 330 can effectively directly read the requested content from storage system 319.

The requested content being read from storage system 319 in the main shared storage resource 310 by network cache device 330 is passed to the original requesting client system 335 along data path 313. In one embodiment, the requested content may pass through network cache device 330. In another embodiment, network cache device 330 may make read request 312 in such a manner that the response to the requested content is formatted in a manner that will be received directly by requesting client system 335 from the shared storage resource 310.

Figure 4A:
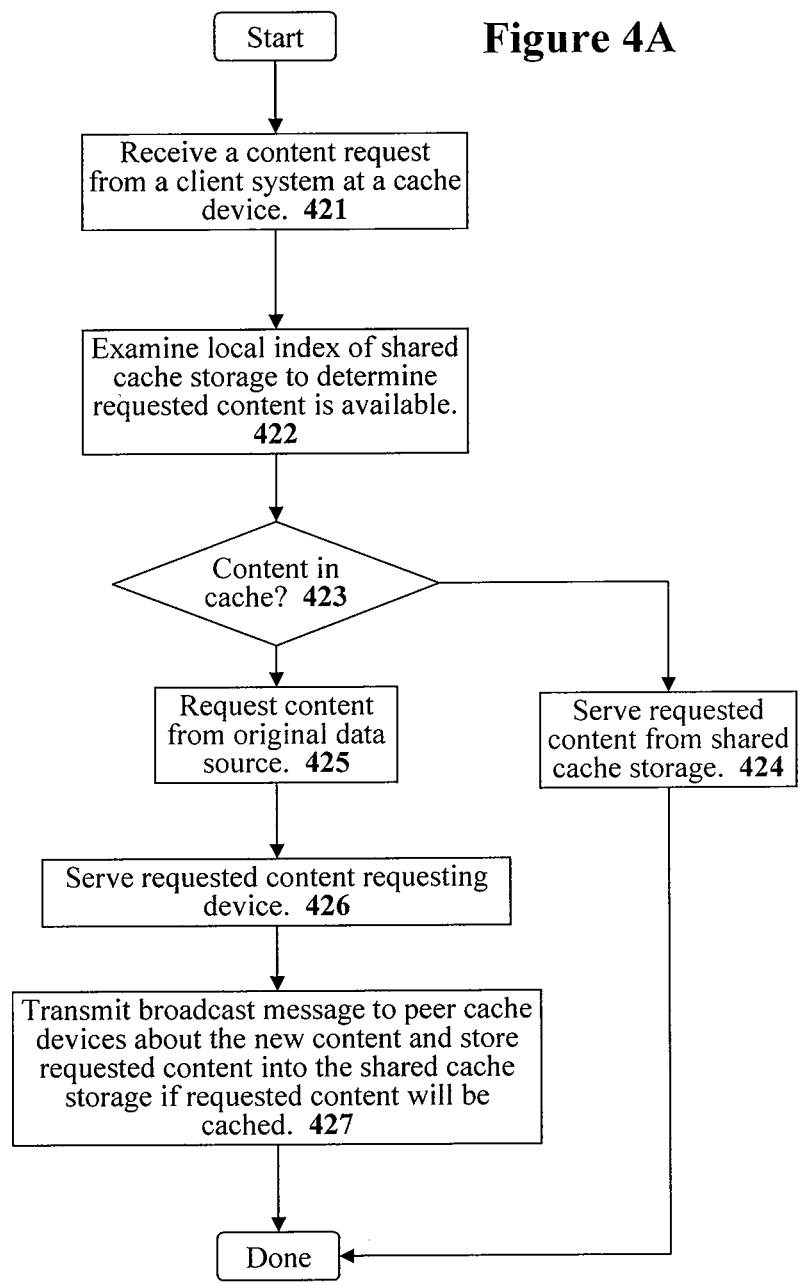
FIG. 4A illustrates a high level flow diagram describing how a network cache device will obtain server requested content and also store that content on the main shared storage resource when that requested content is not currently cached on the main shared storage resource.

When the network cache system of FIG. 3 receives a request for content that is not available in the main shared storage resource, the network cache system must access the requested content from an original source. Furthermore, the network cache system will often create a local cached copy of that requested data for servicing any future requests for that same content. FIGS. 4A and 4B illustrate how the networked cache system of FIG. 3 services requests for content that is not available in the main shared storage resource 410. Specifically, FIG. 4A illustrates a high level flow diagram describing the operation of the process and FIG. 4B illustrates the data flow on the example network.

Referring to FIG. 4A, a cache device receives a content request from a client system at stage 421. This is illustrated in FIG. 4B wherein client system 435 residing on local area network (LAN) 439 may request some content from its local network cache device 430 as depicted by content request data path 411. When network cache device 430 receives such a request for content, the network cache device 430 will then consult its local index 431 of the information stored on main shared storage resource 410 to determine if the content requested by client computer system 435 is currently cached on main shared storage resource 410 as set forth in stage 422 of FIG. 4A. At stage 423, the cache index examination is tested and if the index indicated that the requested content is currently cached in the main shared storage resource 410 then the network cache device 430 will make a data request to the shared storage resource 410 to have the requested content served to the requesting client system 435 as set forth in the example of FIG. 3.

However, when network cache device 430 determines that the requested content is not represented in its local index 431 of the content stored in main shared storage resource 410, then network cache device 430 creates a second request for the requested content at stage 425. The second request for the requested content is sent to the original source of the content. In the example of FIG. 4B, the original source of the content is data source 491 located on the Internet 490 and the second request is depicted by content request message 412 from network cache device 430 to data source 491.

Assuming that the original data source 491 is still available and working properly, original data source 491 will respond to the content request message 412 with a response message 413 containing the requested content. If original data source 491 is not available, the requested data is not available, or any other error occurs then network cache device 430 will have to respond to the requesting system 435 that the requested content is unavailable as is well-known in the art.

When original data source 491 responds with the requested content in response message 413, that requested content may be passed to the original requesting client system 435 along content response message 414 as set forth in stage 426 of FIG.

4A. In one embodiment, the requested content may pass through network cache device 430 that made the request to original data source 491 as depicted by content response message 414 that supplies the request data from cached device 430. In another embodiment, network cache device 430 may make the content request 412 to original data source 491 in such a manner that the content response from original data source 491 is formatted and/or addressed in a manner that will be received directly by requesting client system 435. In such an embodiment, content response path 414 would originate at original data source 491 and go directly to request client system 435. (And if network cache device 430 caches the content as described in the next paragraph, the requested content will go to both the client system 435 that made the original content request and to the network cache device 430.)

In addition to serving the requested content to requesting client system 435, cache device 430 may also have the requested content stored onto the storage system 419 of the main shared storage resource 410 and set forth in stage 427 of FIG. 4A. Specifically, when a caching module in network cache device 430 determines that the requested content may be requested again by another client system, that network cache device 430 will ensure the requested content is written to the main shared storage resource 410. This may occur by having the direct content write request 415 as illustrated in FIG. 4B or by having the requested content also delivered from the original source directly to the main shared storage resource 410. Many different caching methods exist for determining when information should be stored in a cache. In one embodiment, every new piece of requested content is stored on the main shared storage resource 410.

In one embodiment, in addition to writing the content to the main shared storage resource 410, an index entry for the new content may also be written to a back-up shadow index (not shown) stored on the main shared storage resource 410. That back-up shadow index stored on the main shared storage resource 410 may not be used in normal operation but is available for a recovery due to a catastrophic system failure of the network cache system.

In some embodiments, each content item stored to the main shared storage resource 410 is given a Time-To-Live (TTL) period that specifies how long that content will stay on the main shared storage resource 410 before being discarded. Since the main shared storage resource 410 will often eventually become completely filled, a replacement method may be implemented to determine what content items on the main shared storage resource 410 need to be discarded to make room for new content. In one embodiment, the system may discard the content that has the oldest Time-To-Live value starting with the content items having expired Time-To-Live values. However, any other cache replacement systems such as least recently used (LRU), most recently used (MRU), or least frequently used (LFU) may be used instead.

When network cache device 430 has the new (or changed) content item stored to the main shared storage resource 410, cache device 430 also sends out a broadcast or multicast message about this new content as set forth in stage 427 of FIG. 4A. The broadcast or multicast message contains information about the new content stored into the share main shared storage resource 410 and is sent to the to all the other network cache devices (440, 450, 460, 470, and 480) that the share main shared storage resource 410 as depicted by broadcast/multicast message 416. A broadcast message is generally a message sent to all the recipients in a particular domain. A multicast message is a message sent to multiple recipients using an efficient strategy to deliver the messages over each link of a network only once and only creating copies of the message when the links to the recipients split. Either broadcasting or multicasting may be used as long as all the cache devices that share the same main shared storage resource 410 receive the message such that this document will use the terms interchangeably.

The broadcasted message sent to the other network cache devices (440, 450, 460, 470, and 480) will be used by those client devices to update their respective indexes (441, 451, 461, 471, and 481) to the main shared storage resource 410. In one embodiment, the broadcasted message includes identification information about the new content and location information about the new content such that those other client devices can now read that new content directly off the storage system 419 of the main shared storage resource 410. Other additional information may be included as well. The main goal is that any information that will be written into the index 431 of network cache device 430 should be included in the broadcast message so that the other network cache devices (440, 450, 460, 470, and 480) may create an identical entry in their respective indexes (441, 451, 461, 471, and 481). All network cache devices that add new information to the main shared storage resource 410 will follow this process such that the system involves continuous live updates as each peer network caching device places new or updated content to the shared storage resource 410.

The identification information may include the name of the content, the original data source, the size, etc. At a minimum, the identification information for new content should include any information used by a client device in order to recognize when that client device receives a request for the same content. For example, the network address of the content may be included in the message.

The location information includes any information that cache device will use to read the content directly from the main shared storage resource 410. In this manner, all of the network cache devices (430, 440, 450, 460, 470, and 480) that share the main shared storage resource 410 will have the same information in their respective indexes (431, 441, 451, 461, 471, and 481) such that any of the network cache devices can read content written to the main shared storage resource 410 by any of the other network cache devices.

Using web caching as an example, the broadcast message (such as broadcast message 416 in FIG. 4B) to the peer cache devices may include metadata information about the content such as object size, a 'Last Modified Time' returned as part of web server's response, age, entity tag (Etag), cache-control headers, expiration date, date, and request time. Note that the teachings of the disclosed system is not limited to World Wide Web content, but would apply to other caching methodologies such as Common Internet File System (CIFS), File Transport Protocol (FTP), and streaming media. For example, the teachings can also be applied to application servers which front-end a centralized storage repository and require awareness at the front-end server without having actually placed requests to the storage device to determine any changes in stored data state.

In one embodiment, the network cache device that writes new content to the main shared storage resource 410 sends out the broadcast message 416 with information about new content on the main shared storage resource 410 when that network cache device begins writing the new content to the main shared storage resource 410. The broadcasted message 416 will specify where the beginning of the new content file is located on storage system 419 of the main shared storage resource 410. This process of immediately notifying all the other network cache devices ensures that all of listening network cache devices will share an exact, real-time index of content placed on the main shared storage resource 410 by any of the peer cache devices.

Note that in such an embodiment, the other network cache devices receiving the broadcast message 416 may learn about the new content that will be available before that new content is even fully written to the main shared storage resource 410. This can be done since the storage system 419 may be formatted in a manner that writes data files to the main shared storage resource 410 in discrete units of data wherein each data unit specifies where the next unit of data is located on the main shared storage resource 410, as is well-known in the art of disk storage systems. Furthermore, an arbitration system may only allow one network cache device to access a particular data unit at a time when that cache device is writing to the data unit such that other cache devices that may wish to immediately access a new piece of content can access each individual discrete data unit of the new content after it has been written to the storage system 419 by the network cache device that sent out the broadcast message.

In the network cache system set forth in the previous paragraph, once any of the other network cache devices receive a broadcast message informing it about new content in the main shared storage resource 410 and updates its own index, that cache device can immediately begin serving that content to its client constituents. For example, if network cache device 470 receives a content request from client system 476 for the new content just written to the main shared storage resource 410 by network cache device 430 with content write request 415, then network cache device 470 can immediately send a request to the main shared storage resource 410 for that content on behalf of requesting client 476 even though network cache device 430 has not completed writing the new content to main shared storage resource 410.

In a less complex embodiment wherein the storage system 419 can only allow a single cache device to access a particular data file when that data file is being written to, the system may send out two different broadcast messages. A first broadcast message containing content identification information for the new content may be sent out indicating that new content has been received and is currently being written to the main shared storage resource 410. A second broadcast message may subsequently be broadcast after the new content has been completely stored on the main shared storage resource 410 with the location information that will allow any other network cache device to now access that new content. In this manner, if any other network cache device receives the first broadcast message about new content and immediately then receives a request from a client system for that new content, that other network cache device may delay responding the requesting client system until it receives the second broadcast message containing the location information of the requested content on the main shared storage resource. In this manner, there is only a single access to the original source for the requested content.

Expanding the Network Cache System

Figure 5:
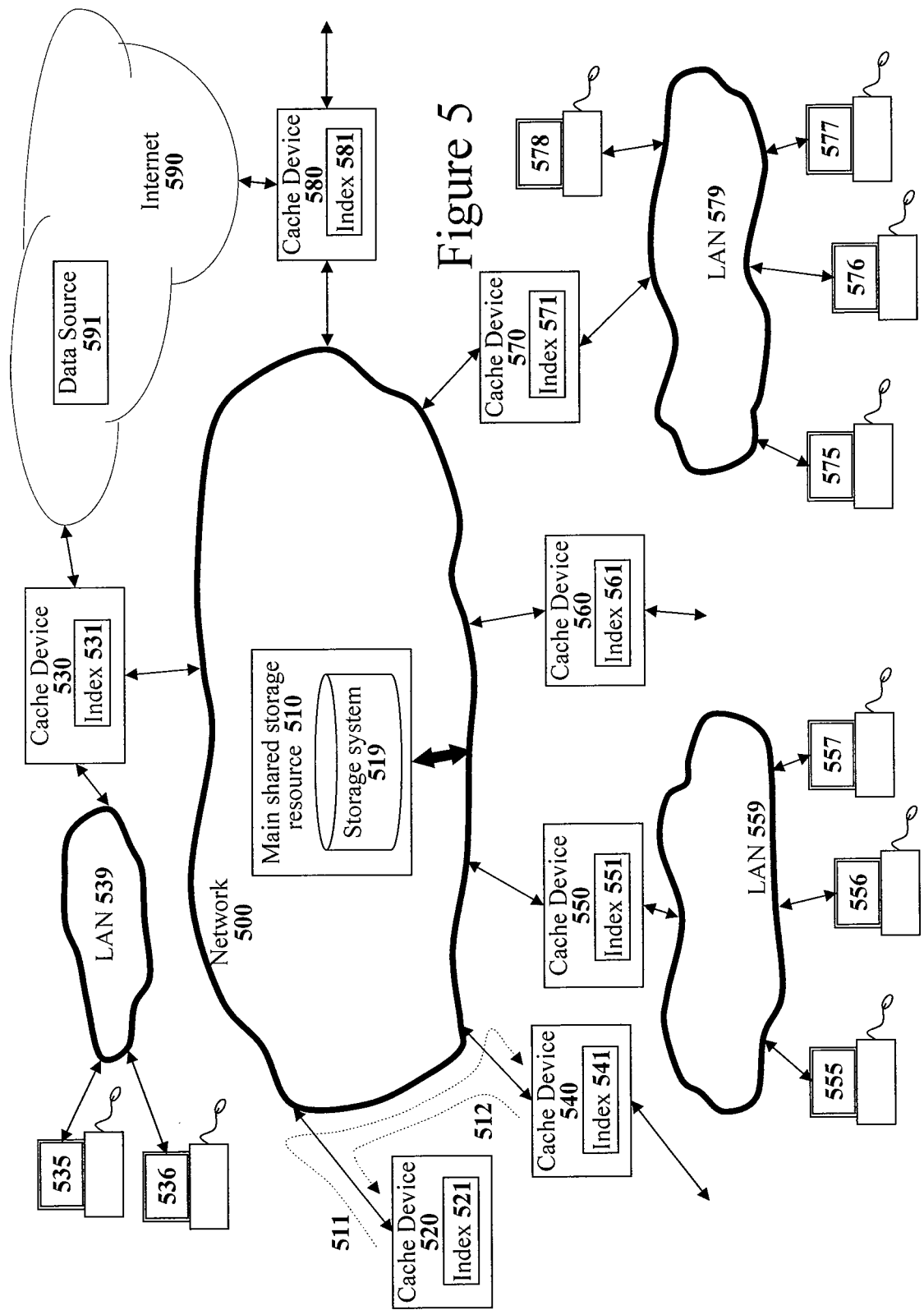
FIG. 5 illustrates how a new network cache device may be added to the network cache system.

The disclosed shared cache system allows for easy expansion. Specifically, additional cache devices can be added at any time in order to serve more client constituents. For example, FIG. 5 illustrates the network cache system of the previous figures wherein a new network cache device 520 has been added to the network cache system. When new network cache device 520 is added to the network cache system, the index 521 in c network ache device 520 will be empty. In one embodiment, a new network cache device 520 added to the network cache system is informed about the main shared storage resource 510 that network cache device 520 will be using. Network cache device 520 may listen to information reads and writes to the main shared storage resource 510 or broadcast messages from the other network cache devices (530, 540, 550, 560, 570, and 580) to learn about the other network cache devices in the network cache system. After learning about the existence of at least one other network cache device in the network cache system, network cache device 520 can request additional information from that other network cache device.

For example, FIG. 5 illustrates network cache device 520 sending an information request 511 to peer network cache device 540. The information request 511 from network cache device 520 may request network cache device 540 to provide a copy of its full index 541 so that new network cache device 520 can learn about all the content information that has already been cached onto the main shared storage resource 510. Peer network cache device 540 that received the request responds with its own index 451 such that network cache device 520 can build its own index 521 that lists all the content stored on main shared storage resource 510. Thus, the end result is that network cache device 520 can create an identical copy of index 541 in index 521.

If no response is received from network cache device 540, then network cache device 520 may simply ask one of the other network cache devices. If network cache device 520 does not detect any other cache devices, it might be the first cache device added to the system. In such a situation, network cache device 520 may begin creating a new index 521 starting from nothing. In one embodiment, network cache device 520 communicates with main shared storage resource 510 to confirm that no other network cache device exists yet.

It should be noted that the network cache system wherein each network cache device of multiple network cache devices maintains its own full index of the main shared storage resource 510 provides some natural redundancy in the network cache system. If one or more of the network cache devices is knocked off-line, the index to the main shared storage resource 510 will reside in other network cache devices that remain online. When a network cache device that has been knocked off-line returns on-line then that cache device can retrieve a full copy of the index for the main shared storage resource 510 from one of its peer network cache devices and then immediately resume operation as normal.

If all of the c network ache devices go off-line then there may be a back-up shadow index stored on the main shared storage resource 510 that may be used, as set forth earlier in this document. That back-up shadow index is not used in normal operation but is available to restore the index for network cache devices if all of the network cache devices are knocked off line at the same time such that no index for the main shared storage resource 510 resides in any network cache device.

Alternate Embodiment with Added Local Caches in Cache Devices

Figure 6:
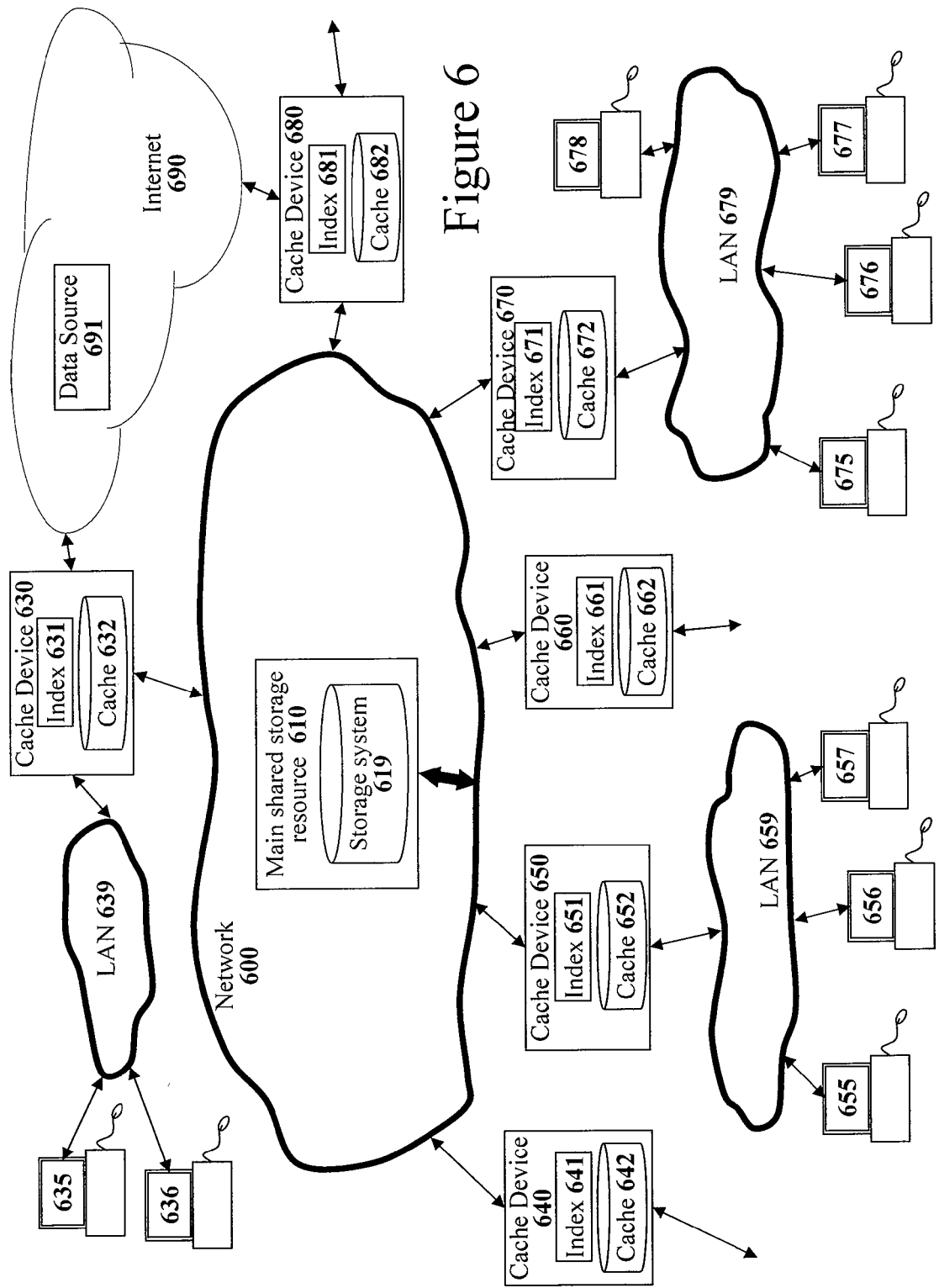
FIG. 6 illustrates how the network cache system may be implemented with local cache storage in each individual cache device in addition to the main shared storage resource.

To reduce the load on the main shared storage resource, each individual cache device may include its own local cache storage. FIG. 6 illustrates an embodiment wherein each of the network cache devices (630, 640, 650, 660, 670, and 680) now has its own local cache storage (632, 642, 652, 662, 672, and 682). With the embodiment of FIG. 6 that includes local cache storage in each network cache device, each network cache device could serve requests from its client constituents using information in its local cache when the requested information is available in that local cache. In this manner, there is no request made to the main shared storage resource 610 such that traffic on that network segment is minimized and the workload of the main shared storage resource 610 is reduced.

With the two layer cache implementation of FIG. 6, it is very important to broadcast any content changes to all the other network cache devices such that those other network cache devices may invalidate their local copy of that content. The changed data will normally be written to the main shared storage resource 610 such that even though other network cache devices will invalidate their local copy of an outdated content item, the new version of that same content item will now be available on the main shared storage resource 610.

Although specific example embodiments have been disclosed, it will be evident that various modifications and changes may be made to these example embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving at a cache device a request from a client system for a content resource, the content resource including content and metadata regarding the content, said cache device comprising a local index of a shared cache storage system, the shared cache storage system being accessible by a plurality of cache devices, each of the plurality of cache devices maintaining a separate local index of the shared cache storage system;
   examining said local index of said shared cache storage system at said cache device to determine whether said content resource is available in said shared cache storage system;
   requesting said content resource from an original data source in response to a determination that said content resource is not available in said shared cache storage system;
   storing said content resource in said shared cache storage system;
   updating said local index of the single shared cache storage system at said cache device receiving the request to include the metadata of said content resource to reflect said content resource stored in said shared cache storage system;
   transmitting a message to at least one peer cache device when storing said content resource in said shared cache storage system, the cache device and the at least one peer cache device sharing a common storage resource in the shared cache storage system; and
   updating said local index at said at least one peer cache device, each peer cache device having a separate local index, in response to said message to reflect said content resource stored in said shared cache storage system.

2. The method as set forth in claim 1, said method further comprising:
   serving said content resource directly from original data source to said client system.

3. The method as set forth in claim 1 wherein said message to at least one peer cache device comprises an identification of said content resource.

4. The method as set forth in claim 3 wherein said identification of said content resource comprises a network address of said content resource at said original data source.

5. The method as set forth in claim 4 wherein said network address of said content resource at said original data source comprises a uniform resource locator.

6. The method as set forth in claim 1 wherein said message to at least one peer cache device comprises a location of said content resource on said shared cache storage system.

7. A method comprising:
   receiving, at a cache device, a message from a peer cache device that stored a new content resource into a shared cache storage system, said message comprising information about said new content resource stored into said shared cache storage system, the content resource containing content and metadata regarding the content, the cache device and the peer cache device sharing a common storage resource in the shared cache storage system, a local index of said shared cache storage system at said peer cache device being updated to include the metadata of said content resource to reflect said new content resource stored into said shared cache storage system, the shared cache storage system being accessible by a plurality of cache devices, each of the plurality of cache devices maintaining a separate local index of the shared cache storage system; and
   updating a local index of said shared cache storage system at said cache device with said information about said new content resource stored into said shared cache storage system such that said cache device can recognize a future request for said new content resource and serve said future request for said new content resource from said shared cache storage system.

8. The method as set forth in claim 7 wherein said message from peer cache device comprises an identification of said content resource.

9. The method as set forth in claim 8 wherein said identification of said content resource comprises a network address of said content resource at an original data source.

10. The method as set forth in claim 7 wherein said message from peer cache device further comprises a location of said new content resource on said shared cache storage system.

11. An apparatus comprising:
    a storage device of a cache device for storing a local index of a shared cache storage system;
    a network cache module coupled to the storage device, said network cache module receiving requests for at least one content resource from at least one client system, the content resource including content and metadata regarding the content, said network cache module serving said at least one content resource from the shared cache storage system when the local index of said shared cache storage system specifies said shared cache storage system contains said at least one content resource; and
    an index maintenance module coupled to the network cache module, said index maintenance module updating said local index of said shared cache storage system at said storage device of said cache device upon receiving a message from a peer cache device that has added new content to said shared cache storage system and has updated a local index of said shared cache storage system at said peer cache device to reflect said new content, the cache device and the peer cache device sharing a common storage resource in the shared cache storage system, each peer cache device having a separate local index.

12. The apparatus as set forth in claim 11 wherein said message from said peer cache device comprises a network address of said new content resource at an original data source.

13. The apparatus as set forth in claim 11 wherein said message from said peer cache device comprises a location of said content resource on said shared cache storage system.

14. A computer-readable, non-transitory medium comprising a set of instructions that, when executed by a computer, perform operations comprising:

receiving at a cache device a request from a client system for a content resource, the content resource including content and metadata regarding the content, said cache device comprising a local index of a shared cache storage system, the shared cache storage system being accessible by a plurality of cache devices, each of the plurality of cache devices maintaining a separate local index of the shared cache storage system;

examining said local index of said shared cache storage system at said cache device to determine whether said content resource is available in said shared cache storage system;

requesting said content resource from an original data source in response to a determination that said content resource is not available in said shared cache storage system;

storing said content resource in said shared cache storage system;

updating said local index of the single shared cache storage system at said cache device receiving the request to include the metadata of said content resource to reflect said content resource stored in said shared cache storage system;

transmitting a message to at least one peer cache device when storing said content resource in said shared cache storage system, the cache device and the at least one peer cache device sharing a common storage resource in the shared cache storage system; and updating said local index at said at least one peer cache device in response to said message to reflect said content resource stored in said shared cache storage system.

15. The computer-readable, non-transitory medium as set forth in claim 14 wherein said message to at least one peer cache device comprises a network address of said content resource at said original data source.

16. The computer-readable, non-transitory medium as set forth in claim 15 wherein said message to at least one peer cache device comprises a location of said content resource on said shared cache storage system.

* * * * *